(12) United States Patent
Kim et al.

(10) Patent No.: US 6,834,963 B2
(45) Date of Patent: Dec. 28, 2004

(54) ILLUMINATION SYSTEM AND PROJECTOR ADOPTING THE SAME

(75) Inventors: Sung-ha Kim, Gyeonggi-do (KR); Kirill Sergeevich Sokolov, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/207,123

(22) Filed: Jul. 30, 2002

(65) Prior Publication Data

US 2003/0063262 A1 Apr. 3, 2003

(30) Foreign Application Priority Data

Sep. 29, 2001 (KR) ........................................ 2001-61035

(51) Int. Cl.[7] .................. G03B 21/00; G03B 21/26; G03B 21/28; G02B 5/32; H01P 5/00
(52) U.S. Cl. ....................... 353/31; 353/37; 353/94; 359/15; 362/558; 362/555
(58) Field of Search .................. 353/30, 31, 32, 353/33, 81, 84, 85, 122, 98, 99, 5, 37, 94, 102; 349/7–9; 359/15, 16, 34; 365/555, 558, 560, 561, 230, 231, 241

(56) References Cited

U.S. PATENT DOCUMENTS

| | | | | |
|---|---|---|---|---|
| 6,113,239 A | * | 9/2000 | Sampsell et al. | .............. 353/31 |
| 6,185,016 B1 | * | 2/2001 | Popovich | ...................... 359/15 |
| 6,211,976 B1 | * | 4/2001 | Popovich et al. | .............. 359/15 |
| 6,254,246 B1 | * | 7/2001 | Tiao et al. | ...................... 362/31 |
| 6,577,429 B1 | * | 6/2003 | Kurtz et al. | ................. 359/279 |
| 6,665,100 B1 | * | 12/2003 | Klug et al. | .................... 359/23 |

FOREIGN PATENT DOCUMENTS

| | | |
|---|---|---|
| JP | 58-040520 | 3/1983 |
| JP | 03-002745 | 1/1991 |
| JP | 06-051125 | 2/1994 |
| WO | WO99/49358 | 9/1999 |

\* cited by examiner

*Primary Examiner*—Alan Mathews
*Assistant Examiner*—Andrew Sever
(74) *Attorney, Agent, or Firm*—Staas & Halsey LLP

(57) ABSTRACT

An illumination system which realizes a color image without a color wheel and a projector adopting the illumination system. The illumination system comprises at least one light emitting device which emits a light beam having a predetermined wavelength and a holographic optical element which reduces a cross section of the light beam. The projector includes the illumination system, a display device which forms an image by processing light from the illumination system according to an input image signal, and a projection lens which magnifies and projects the image onto a screen. The light emitting device may be constructed in an array form and the arrays may be arranged inline and adjacent to an optical path changer or distributed around an optical path changer at predetermined angles. The arrays and holographic optical elements may be provided in layers in order to reduce a size of the illumination system.

42 Claims, 9 Drawing Sheets

ILLUMINATION SYSTEM AND PROJECTOR ADOPTING THE SAME

CROSS REFERENCE TO RELATED APPLICATIONS

This application claims the benefit of Korean Application No. 2001-61035 filed Sep. 29, 2001, in the Korean Industrial Property Office, the disclosure of which is incorporated herein by reference.

BACKGROUND OF THE INVENTION

1. Field of the Invention

The present invention relates to an illumination system and a projector adopting the same, and more particularly, to an illumination system which realizes a color image without a color wheel by using a light emitting device or light emitting device array, and a projector adopting the same.

2. Description of the Related Art

Figure 1:
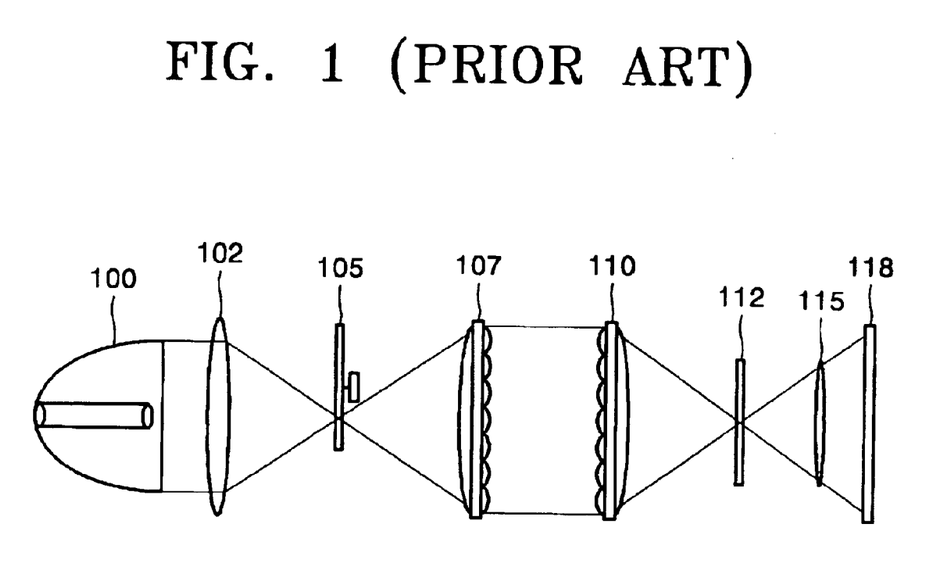
FIG. 1 is a view showing the structure of a conventional projector.

Referring to FIG. 1, a conventional single panel projector includes a light source 100, a first relay lens 102 which condenses a light beam emitted from the light source 100, a color wheel 105 which splits an incident light beam into three light beams of red (R), green (G) and blue (B) colors, a fly eye lens 107 which makes the light beam passing through the color wheel 105 uniform, a second relay lens 110 which condenses the light beam passing through the fly eye lens 107, a display device 112 which forms a color image from the R, G and B color beams which are sequentially incident after passing through the color wheel 105, and a projection lens unit 115 which magnifies the image formed by the display device 112 and projects the magnified image onto a screen 118.

A xenon lamp, a metal-halide lamp, or a UHP lamp is used as the light source 100. These lamps emit excess infrared and ultraviolet rays. Accordingly, a great amount of heat is generated, and a cooling fan is necessary. However, the cooling fan is a source of noise. Also, since the spectrum of the light source lamp is widely distributed across the entire wavelength spectrum, due to a narrow color gamut, the selection of color is limited, color purity is inferior, and a life span of the lamp is short, making stable use of the lamp undesirable.

In the conventional single panel projector, to realize a color image, the color wheel 105 is rotated by a driving motor (not shown) at a high speed so that R, G and B color light beams are sequentially incident onto the display device 112. However, since R, G and B color filters are equally arranged over the entire surface of the color wheel 105, and the filters are used one by one during the rotation of the color wheel 105, according to a response speed of the display device 112, ⅔ of the light emitted by the light source 100 is lost. Also, since a gap of a predetermined width separates neighboring color filters for preferable generation of color, light is also lost at the gap.

Since the color wheel 105 rotates at a high speed, noise is generated. Also, the mechanical movement of the driving motor has a bad effect on stability, and, due to mechanical limits in the driving motor, it is difficult to obtain speeds past a certain point, and a color breakup phenomenon occurs. Further, since the color wheel is very expensive, the manufacturing cost of a projector rises.

SUMMARY OF THE INVENTION

To solve the above-described problems, it is an object of the present invention to provide an illumination system having a light emitting device or light emitting device array and a holographic optical element, to improve color purity and color selection and to realize a color image without a color wheel, and a projector adopting the illumination system.

Additional objects and advantages of the invention will be set forth in part in the description which follows, and, in part, will be obvious from the description, or may be learned by practice of the invention.

To achieve the above and other objects of the invention, there is provided an illumination system comprising at least one light emitting device which emits a light beam having a predetermined wavelength, and a holographic optical element which reduces the cross section of the light beam emitted from the light emitting device.

The light emitting device may comprise one of an LED (light emitting diode), an LD (laser diode), an organic EL (electro luminescent), and an FED (field emission display).

The illumination system may further comprise a parallel light beam forming unit which makes the light beam emitted from the light emitting device a parallel light beam.

The parallel light beam forming unit may further comprise a collimating lens array or a Fresnel lens array.

The illumination system may further comprise an optical path changing unit which changes a path of a light beam by selectively transmitting or reflecting the light beam exiting from the holographic optical element.

A plurality of light emitting devices may be arranged in a form of an array.

A plurality of light emitting devices or light emitting device arrays which emit light beams having different wavelengths may be arranged in a line.

The optical path changing unit may be a dichroic filter which reflects or transmits the light beam exiting from the holographic optical element according to the wavelength of the light beam.

The optical path changing unit may be a cholesteric band modulation filter which reflects or transmits the light beam exiting from the holographic optical element according to a polarization direction and a wavelength of the light beam.

The cholesteric band modulation filter may comprise a first mirror surface which reflects a light beam of right circular polarization and transmits a light beam of left circular polarization, and a second mirror surface which transmits a light beam of right circular polarization and reflects a light beam of left circular polarization, with respect to a light beam having a predetermined wavelength.

A plurality of light emitting devices or light emitting device arrays which emit light beams having different wavelengths may be arranged to be separated by a predetermined angle.

The optical path changing unit may be an X prism or X type dichroic filter.

The light emitting device or the light emitting device array and the holographic optical element may be further arranged in a multiple layer structure.

To achieve the above and other objects of the present invention, there is provided a projector comprising an illumination system; a display device which forms an image by processing a light beam emitted from the illumination system according to an input image signal; and a projection lens unit which magnifies the image formed by the display device and projects the magnified image onto a screen; wherein the illumination system comprises at least one light emitting device which emits a light beam having a predetermined wavelength, and a holographic optical element arranged on an optical path of the emitted light beam which reduces a cross section of the light beam emitted from the light emitting device.

The projector may further comprise a fly eye lens which makes the light beam emitted from the illumination system a parallel beam, and a relay lens which condenses the light beam passing through the fly eye lens toward the display device.

BRIEF DESCRIPTION OF THE DRAWINGS

The above and other objects and advantages of the present invention will become more apparent by describing in detail embodiments thereof with reference to the attached drawings in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

Figure 2:
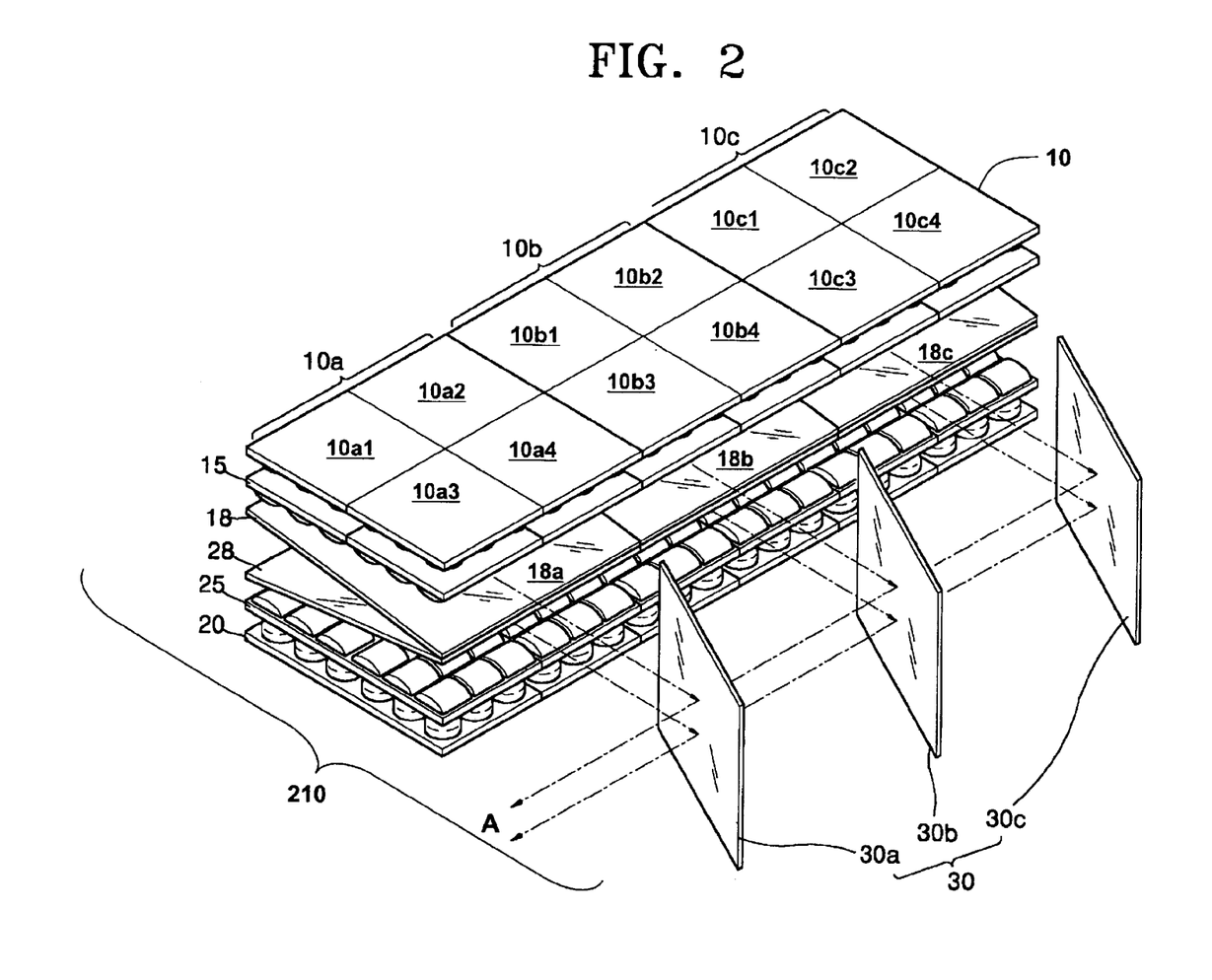
FIG. 2 is a perspective view of an illumination system according to a first embodiment of the present invention.

Referring to FIG. 2, an illumination system 210 according to a first embodiment of the present invention comprises a light emitting device 10 which emits a light beam having a predetermined wavelength, a holographic optical element 18 which minimizes a cross section of the light beam emitted from the light emitting device 10, and an optical path changing unit 30 which changes an optical path by selectively transmitting or reflecting the light beam passing through the holographic optical element 18.

The light emitting device 10 may be formed as one of an LED (light emitting diode), an LD (laser diode), an organic EL (electro luminescent), and an FED (field emission display). Alternatively, the light emitting device 10 may comprise a plurality of other light emitting devices arranged in an array.

The light emitting device 10 may be formed of first, second, and third light emitting devices 10a, 10b, and 10c, each emitting a light beam having a different wavelength. Also, the light emitting device 10 may further be provided in multiple layers. For example, another light emitting device array 20 may be provided facing toward the light emitting device 10.

Each of the light emitting devices 10a, 10b and 10c may also be formed of an array of yet other light emitting devices. Thus, the light emitting device 10 may be an array of other arrays of other light emitting devices. That is, the light emitting device 10 may be an array of light emitting devices 10a, 10b and 10c; and the light emitting device 10a may be an array of light emitting devices 10a1, 10a2, 10a3 and 10a4, the light emitting device 10b may be an array of light emitting devices 10b1, 10b2, 10b3 and 10b4, and the light emitting device 10c may be an array of light emitting devices 10c1, 10c2, 10c3 and 10c4. A number of devices in the arrays shown in FIG. 2 is for the purpose of illustrating the invention and is not intended to be limiting.

Figure 3:
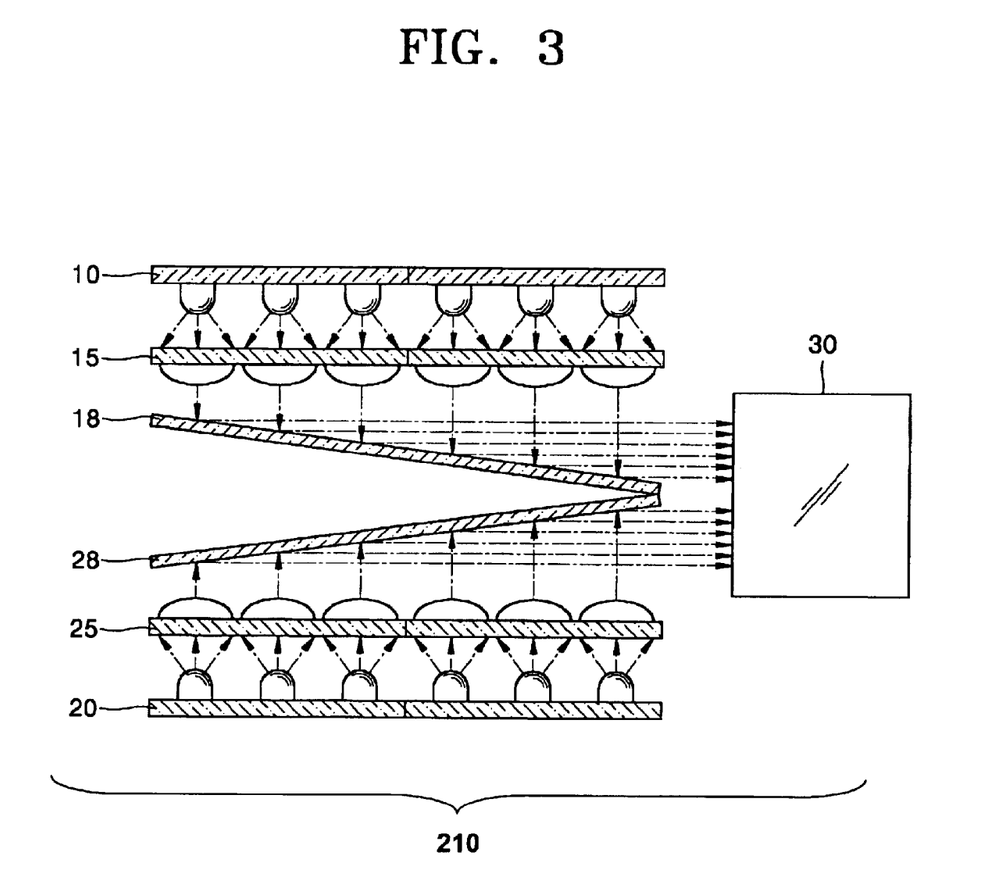
FIG. 3 is a front view of the illumination system of FIG. 2.

The holographic optical element 18 and a holographic optical element 28 are symmetrically arranged between the light emitting devices 10 and 20. The holographic optical elements 18 and 28 are designed such that as the light beams emitted from the light emitting devices 10 and 20 are reflected, and their cross sections are minimized. That is, as shown in FIG. 3, when the light beams emitted from the light emitting devices 10 and 20 are reflected by the holographic optical elements 18 and 28, an overall cross section of the light beams reflected by the holographic optical elements 18 and 28 is less than an overall cross section of the light beams incident on the holographic optical elements 18 and 28. Thus, the volume occupied by the illumination system is reduced for a predetermined amount of light, and light loss is reduced.

In the first embodiment, parallel light beam forming units 15 and 25, such as a collimating lens array or a Fresnel lens array, which make the light beam emitted from the light emitting devices 10 and 20 into a parallel light beam, are further provided between the light emitting device 10 and the holographic optical element 18 and between the light emitting device 20 and the holographic optical element 28. In the present embodiment, a collimating lens array is used as the parallel light beam forming units 15 and 25.

Since the light emitting devices 10 and 20 are symmetrically arranged, including the parallel light beam forming units 15 and 25 and the holographic optical elements 18 and 28, the optical functions of the light emitting devices 10 and 20 are the same. Thus, only the light emitting device 10 will be described.

Figure 4:
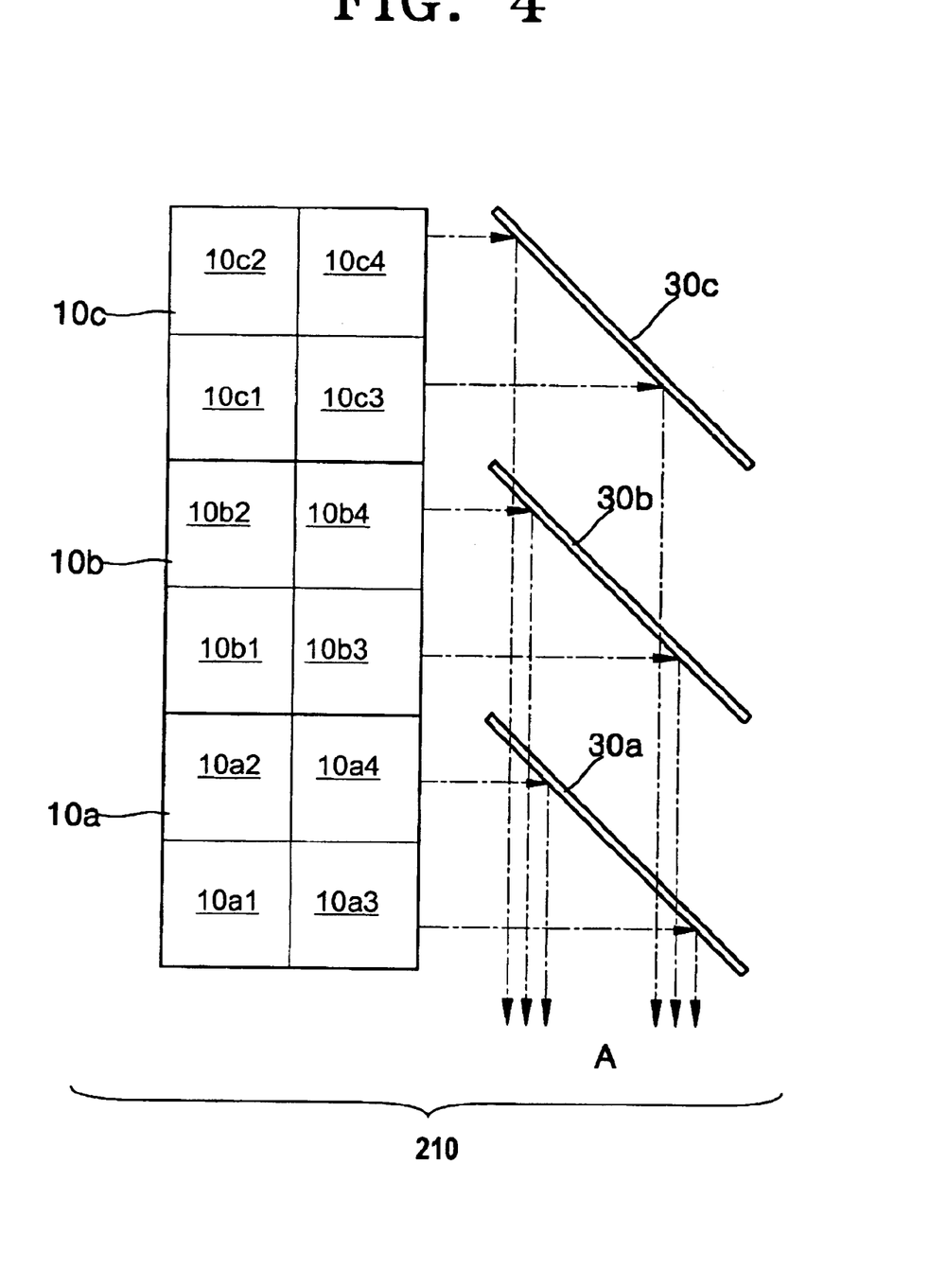
FIG. 4 is a plan view of the illumination system of FIG. 2.

According to the first embodiment of the present invention, as shown in FIGS. 2, 3 and 4, where the light emitting device 10 is an array formed of the first, second, and third light emitting device arrays 10a, 10b, and 10c, the first, second and third light emitting device arrays may be arranged in a line. The light beam emitted from each of the first, second, and third light emitting device arrays 10a, 10b, and 10c passes through the collimating lens array 15 and the holographic optical element 18 and proceeds towards the optical path changing unit 30. The optical path changing unit 30 selectively transmits or reflects light to make incident light beams input along different optical paths proceed along the same optical path. The optical path changing unit 30 may include first, second, and third dichroic filters 30a, 30b, and 30c which reflect or transmit according to the wavelength of the light beam emitted from each of the first, second, and third light emitting device arrays 10a, 10b, and 10c. For example, light beams having red (R), green (G), and blue (B) wavelengths may be emitted from the first, second, and third light emitting device arrays 10a, 10b, and 10c, respectively.

The first dichroic filter 30a reflects an R light beam only and transmits the other light beams having G and B wavelengths. The second dichroic filter 30b reflects a G light beam only and transmits the other light beams having R and B wavelengths. The third dichroic filter 30c reflects a B light beam only and transmits the other light beams having R and G wavelengths. Thus, when the R light beam emitted from the first light emitting device array 10a is incident on the first dichroic filter 30a via the collimating lens array 15 and the holographic optical element 18, the light beam is reflected by the first dichroic filter 30a, and proceeds in the direction indicated by an arrow A shown in FIG. 4. Also, when the G light beam emitted from the second light emitting device array 10b is incident on the second dichroic filter 30b via the collimating lens array 15 and the holographic optical element 18, the light beam is reflected by the second dichroic filter 30b and passes through the first dichroic filter 30a, to proceed in the direction A. When the B light beam emitted from the third light emitting device array 10c is incident on the third dichroic filter 30c via the collimating lens array 15 and the holographic optical element 18, the light beam is reflected by the third dichroic filter 30c and passes through the second and first dichroic filters 30b and 30a, to proceed in the direction A. As a result, the R, G, and B color light beams, incident on different optical paths, proceed along the same optical path.

Figure 5:
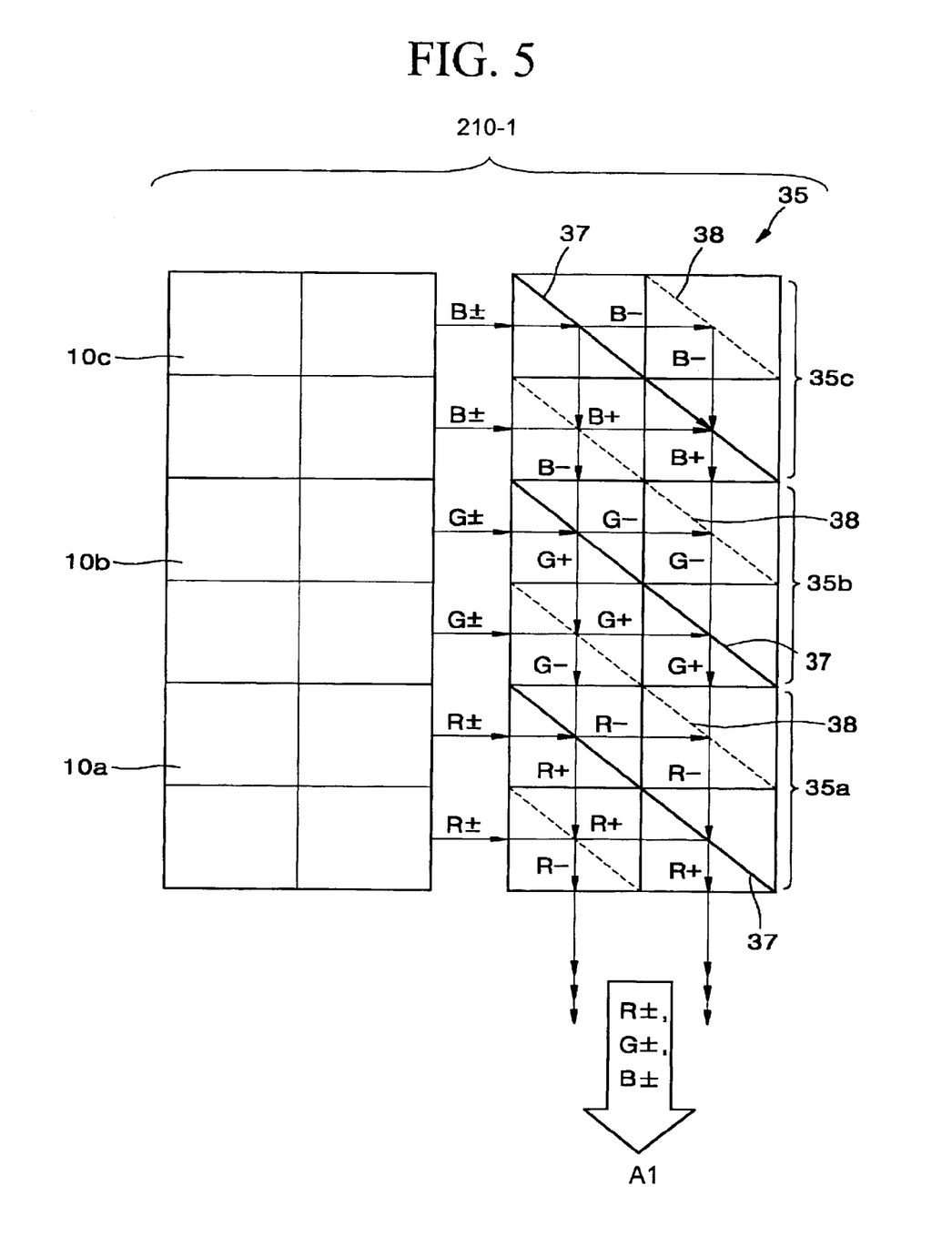
FIG. 5 is a view showing an optical path in an illumination system according to a second embodiment of the present invention.

Alternatively, the illumination system may be constructed as an illumination system 210-1 as shown in FIG. 5. In the illumination system 210-1, a cholesteric band modulation filter 35, which selectively reflects or transmits according to a polarization direction of incident light, may be used as the optical path changing unit. The cholesteric band modulation filter 35 changes the optical path of a light beam having a predetermined wavelength, for example, by reflecting a light beam of right circular polarization and transmitting a light beam of left circular polarization, or by transmitting a light beam of right circular polarization and reflecting a light beam of left circular polarization. The cholesteric band modulation filter 35 may include first, second, and third cholesteric band modulation filters 35a, 35b, and 35c which selectively transmit or reflect according to the direction of circular polarization of an R light beam, a G light beam, and a B light beam, respectively.

To improve the efficiency of light by using both light beams of right circular polarization and left circular polarization, each of the first, second, and third cholesteric band modulation filters 35a, 35b, and 35c includes a first mirror surface 37 for reflecting a light beam of right circular polarization and transmitting a light beam of left circular polarization, of the wavelength corresponding to the respective filter, and a second mirror surface 38 for transmitting a light beam of right circular polarization and reflecting a light beam of left circular polarization, which are appropriately arranged. Here, the light beam of right circular polarization and the light beam of left circular polarization are indicated by + and −, respectively. For example, R+ denotes an R light beam of right circular polarization while R− denotes an R light beam of left circular polarization.

The light beams emitted from the first, second, and third light emitting device arrays 10a, 10b, and 10c and passing through the collimating lens array 15 and the holographic optical element 18 proceed toward the first, second, and third cholesteric band modulation filters 35a, 35b, and 35c, respectively. In each of the first, second, and third cholesteric band modulation filters 35a, 35b, and 35c, the first and second mirror surfaces 37 and 38 are provided diagonally with respect to the direction in which the light beam is input.

In the case of the path of the R light beam, when the light beam of right circular polarization (R+) of the R light beam reflected from the holographic optical element 18 first meets the first mirror surface 37, the light beam is reflected by the first mirror surface 37. Then, when that light beam meets the second mirror surface 38 in its path, the light beam is transmitted, to proceed in a direction indicated by an arrow A1 of FIG. 5. In the meantime, when the light beam first meets the second mirror surface 38, the light beam passes through the second mirror surface 38 and is reflected by the first mirror surface 37, to proceed in the direction A1. Conversely, when the light beam of left circular polarization (R−) of the R light beam reflected by the holographic optical element 18 first meets the first mirror surface 37, the light beam passes through the first mirror surface 37. Then, when that light beam meets the second mirror surface 38 in its path, the light beam is reflected by the second mirror surface 38 to proceed in the direction A1. In the meantime, when the light beam first meets the second mirror surface 38, the light beam is reflected by the second mirror surface 38 to proceed in the direction A1.

The above process is equivalently applied to the right circular polarization G+ and the left circular polarization G− of the G light beam, and to the right circular polarization B+ and the left circular polarization B− of the B light beam, so that all the light beams finally proceed in the same direction, i.e., the direction A1. The first, second, and third cholesteric band modulation filters 35a, 35b, and 35c each selectively transmit or reflect light beams having a respective corresponding wavelength, but transmit all light beams having different wavelengths, regardless of the direction of polarization. Thus, since all the light beams of right circular polarization and the left circular polarization can be used effectively, the efficient of light is very high.

Figure 6:
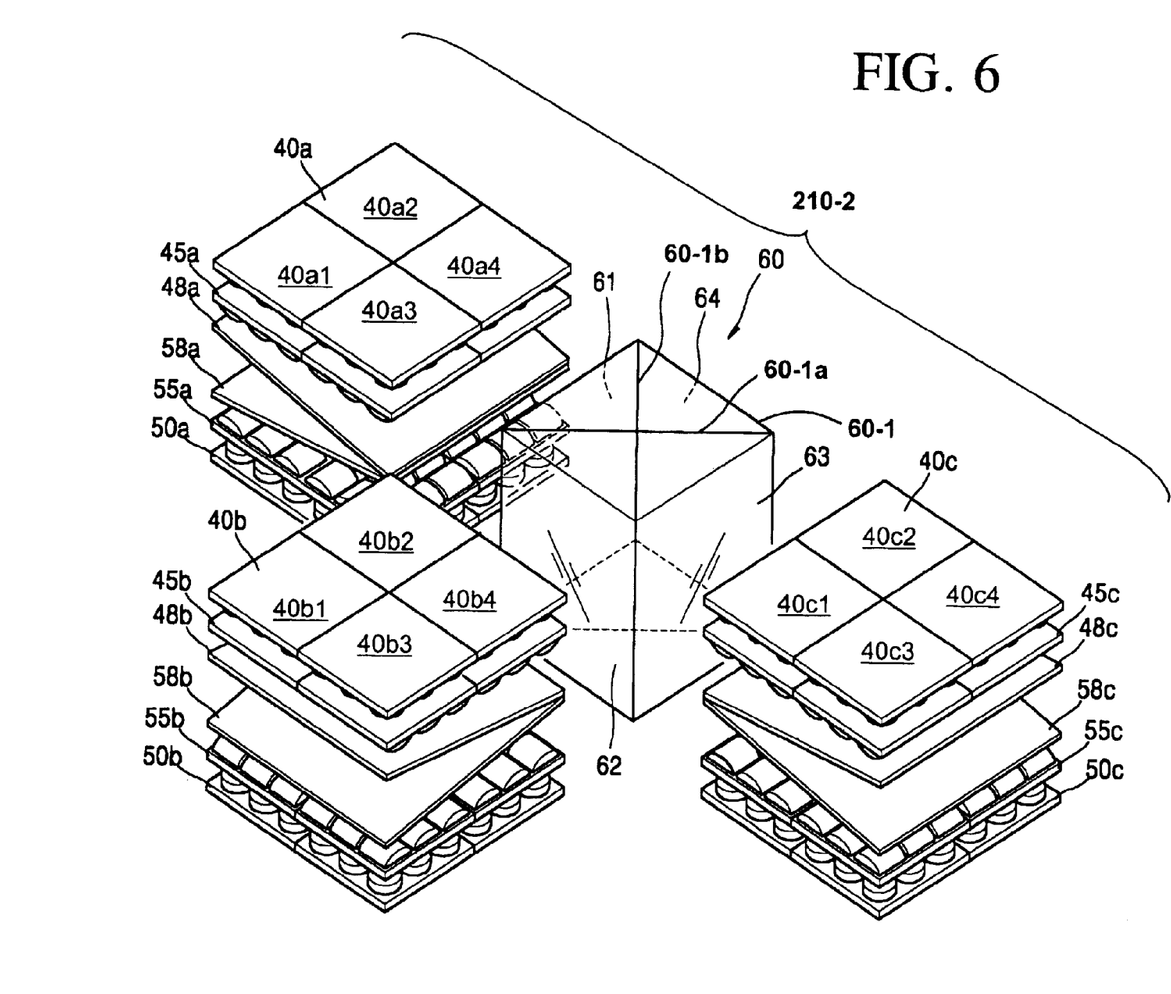
FIG. 6 is a perspective view of an illumination system according to a third embodiment of the present invention.

FIG. 6 shows an illumination system 210-2 according to a third embodiment of the present invention. Referring to FIG. 6, an illumination system according to the third embodiment comprises: first, second, and third light emitting device arrays 40a, 40b, and 40c, each of which emits a light beam having a different wavelength; parallel light beam forming units 45a, 45b, and 45c which make each of the light beams emitted from the first, second, and third light emitting device arrays 40a, 40b, and 40c parallel; first, second, and third holographic optical elements 48a, 48b, and 48c which respectively reflect an incident light beam which has passed through the parallel light beam forming units 45a, 45b, and 45c and reduce a cross section of a respective light beam, and an optical path changing unit 60 which changes a path of light beams input from different directions. The parallel light beam forming units 45a, 45b, and 45c may be collimating lens arrays or Fresnel lens arrays.

In the third embodiment, a fourth light emitting device array 50a, a fourth collimating lens array 55a, and a fourth holographic optical element 58a may be provided symmetrical to the first light emitting device array 40a, the first collimating lens array 45a, and the first holographic optical element 48a, respectively. Further, fifth and sixth light emitting device arrays 50b and 50c, fifth and sixth collimating lens arrays 55b and 55c, and fifth and sixth holographic optical elements 58b and 58c may be provided symmetrical to the second and third light emitting device arrays 40b and 40c, the second and third collimating lens arrays 45b and 45c, and the second and third holographic optical elements 48b and 48c, respectively. By forming the light emitting device array in multiple layers, a maximum light amount is producible in a minimum space. Since the operation of the first through third light emitting device arrays 40a, 40b, and 40c is the same as the fourth through sixth light emitting device arrays 50a, 50b, and 50c, respectively, the operation of the first through third light emitting device arrays 40a, 40b, and 40c only will be described.

The optical path changing unit 60 is illustrated in FIG. 6 as an X prism 60-1. The optical path changing unit 60 may also be formed of an X-type dichroic filter film. The first through third light emitting device arrays 40a, 40b, and 40c are arranged to be separated by a predetermined angle with respect to the X prism 60-1. The X prism 60-1 has first, second, and third incident surfaces 61, 62, and 63 disposed to face the respective holographic optical elements 48a, 48b, and 48c, so that the light beams reflected by the first, second, and third holographic optical elements 48a, 48b, and 48c are received, and an exit surface 64. Also, the X prism 60-1 has a first mirror surface 60-1a which reflects a light beam incident on the first incident surface 61 and transmits light beams incident on the second and third incident surfaces 62 and 63, and a second mirror surface 60-1b which reflects a light beam incident on the third incident surface 63 and transmits light beams incident on the first and second incident surfaces 61 and 62. The first and second mirror surfaces 60-1a and 60-1b cross each other like a letter X to selectively transmit or reflect incident light beams according to the wavelength thereof. For example, the first mirror surface 60-1a reflects the R light beam and transmits the other light beams having G and B wavelengths. The second mirror surface 60-1b reflects the B light beam and transmits the other light beams having R and G wavelengths.

Figure 7:
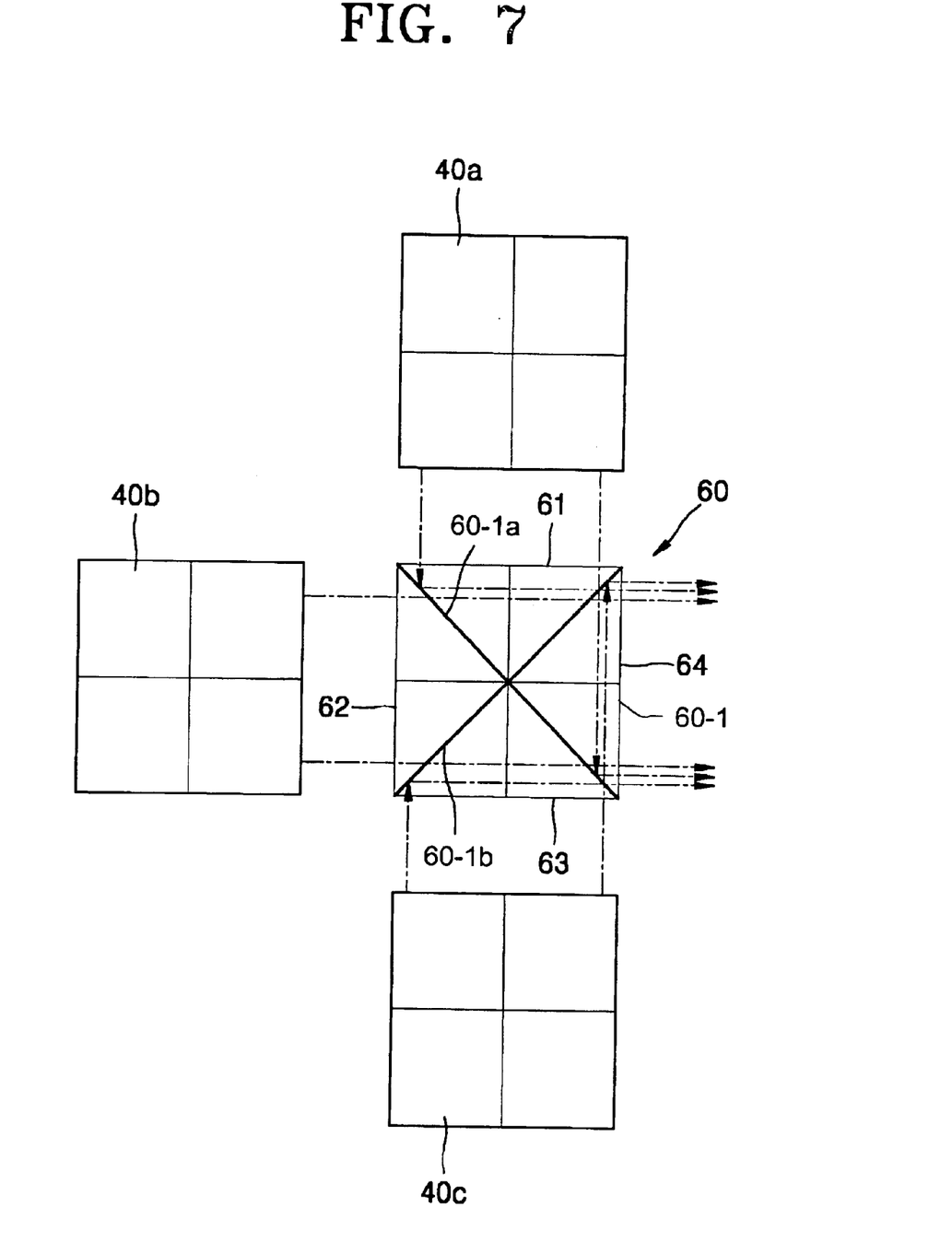
FIG. 7 is a plan view of the illumination of FIG. 6.

FIG. 7 is a plan view of the illumination system illustrated in FIG. 6. Referring to FIG. 7, the R, G, and B light beams emitted from the first through third light emitting device arrays 40a, 40b, and 40c and passing through the first through third holographic optical elements 48a, 48b, and 48c are incident on the corresponding first through third incident surfaces 61, 62, and 63 of the X prism 60-1. The R, G, and B light beams input along different paths are transmitted or reflected by the first and second mirror surfaces 60-1a and 60-1b, to exit in the same direction passing through the exit surface 64.

The light emitting device array according to the first, second and third embodiments may be arranged in various ways, and the optical path changing units 30, 35, and 60 are selected suitably for the arrangement.

Figure 8:
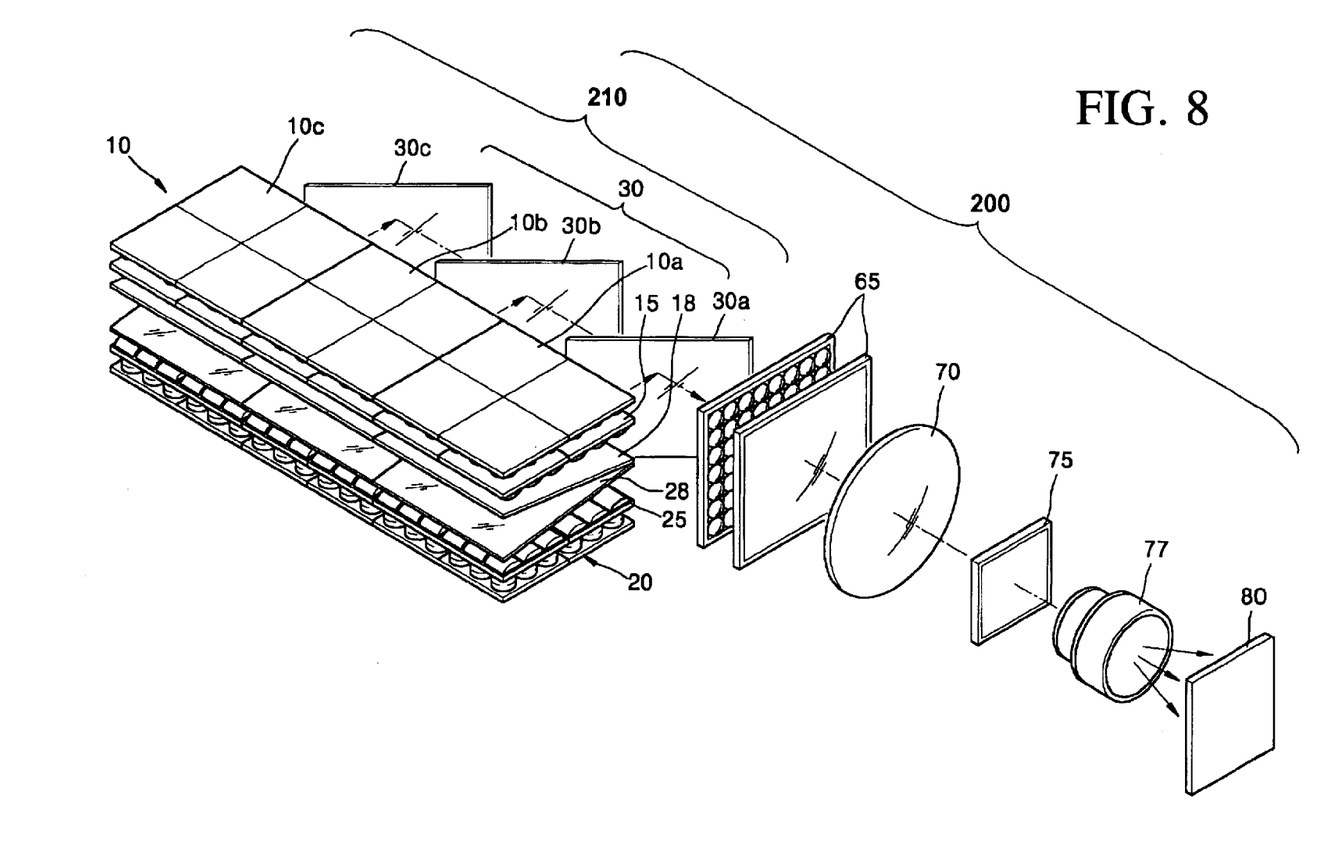
FIG. 8 is a perspective view showing a structure of a projector adopting the illumination system according to the present invention.

A projector 200 adopting the illumination system of the present invention is illustrated in FIG. 8. The projector 200, as shown in FIG. 8 comprises an illumination system 210 which emits a light beam, a display device 75 which forms an image using the R, G, and B light beams emitted from the illumination system 210, and a projection lens unit 77 which projects the image formed by the display device 75 onto a screen 80. The illumination system 210 comprises a plurality of the light emitting device arrays 10 and 20 formed of at least one light emitting device for emitting a light beam having a predetermined wavelength, holographic optical elements 18 and 28 which reflect the light beam emitted from the light emitting device arrays 10 and 20 while minimizing a cross section of the light beam, and the optical path changing unit 30 for changing the optical path by selectively transmitting or reflecting the light beams incident from the holographic optical elements 18 and 28.

The light emitting device array 10 is formed of the first through third light emitting device arrays 10a, 10b, and 10c, each emitting an R, G, or B light beam. To secure a sufficient light amount, one or more layers of the light emitting device array 20 having the same structure as the light emitting device array may further be provided symmetrically. When the first through third light emitting device arrays 10a, 10b, and 10c are arranged in a line as shown in FIGS. 2 and 8, the R, G, and B light beams reflected by the holographic optical element 18 exit in the same direction, parallel to one another.

The optical path changing unit 30 comprises the first through third dichroic filters 30a, 30b, and 30c to change the paths of the R, G, and B light beams by selectively transmitting or reflecting the light beams according to a respective wavelength of the R, G, and B light beams.

A fly eye lens 65, which uniformly distributes the R, G, and B light beams output in the same direction from the first through third dichroic filters 30a, 30b, and 30c, and a relay lens 70 which condenses the light beam toward the display device 75, may also be provided. A color image is formed by the display device 75 using the R, G, and B light beams. The display device 75 may be a mobile mirror apparatus which realizes a color image by an on/off switching action of micromirrors, or an LCD device which realizes a color image by modulating the polarization of an incident light beam.

Here, in the above description, the first through third dichroic filters 30a, 30b, and 30c are used as the optical path changing unit 30. However, the cholesteric band modulation filter 35 for transmitting or reflecting the incident light beam according to its direction of circular polarization can also be used.

Also, the X prism 60-1 or the X type dichroic filter can be used, to change the optical path of the R, G, and B light beams input from different directions to exit in the same direction by reflecting or transmitting the incident light beam according to their wavelength. Here, the first through third light emitting device arrays 40a, 40b, and 40c are arranged to be separated by a predetermined angle with respect to the X prism 60-1 or the X type dichroic filter, as shown in FIG. 7. The illumination system having the above structure can replace the illumination system including the first through third light emitting device arrays 10a, 10b, and 10c and the dichroic filters 30a, 30b, and 30c.

The R, G, and B light beams emitted from the above illumination system are incident on the display device 75 via the fly eye lens 65 and the relay lens 70 to form a color image. The color image is magnified by the projection lens unit 77 and projected onto the screen 80.

Figure 9:
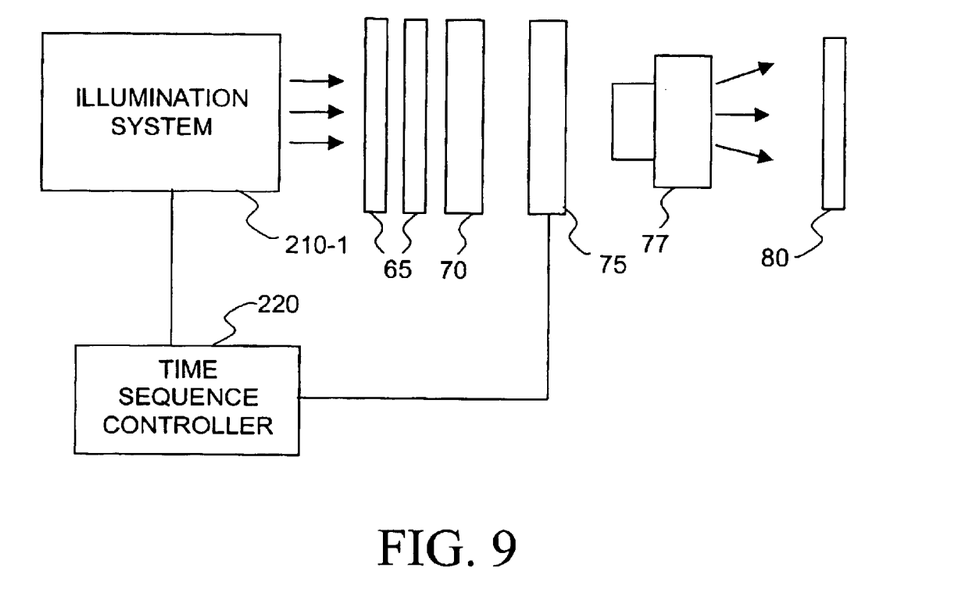
FIG. 9 is a block diagram of another projector adopting the illumination system according to the present invention.

Referring now to FIG. 9, another projector adopting the illumination system according to the present invention is illustrated. The projector illustrated in FIG. 9, is similarly constructed as the projector illustrated in FIG. 8. The projector shown in FIG. 9, further comprises a time sequence controller 220 which controls a time sequence of the light emitters or the light emitting arrays of the illumination system 210 according to a wavelength of the emitted light. Alternatively, the time sequence controller 220 simultaneously controls the illumination system 210 to emit the light according to the wavelength and the display device 75 to provide respective image signals which are synchronized with the emitted light according to the wavelength. Although the projector is shown in FIG. 9 as including the illumination system 210, the illumination system 210-1 or the illumination system 210-2 may also be used.

As described above, since the light emitting device illumination according to the present invention emits a light beam having a narrow spectrum of a desired wavelength, color purity is improved and a color gamut having a wider distribution can be achieved. Also, as the cross section of the light beam emitted by the holographic optical element is minimized, the illumination system is made compact and loss of light can be reduced. Further, compared to the conventional lamp light source, less heat is generated and the life span is extended. Also, in the projector adopting the light emitting device illumination system according to the present invention, since the light emitting device illumination system may be time sequential driven, the color wheel is not needed. Also, since the light beam can be switched faster than the possible rotation speed of the color wheel, a high frame rate is realizable and power consumption may be reduced. Therefore, the projector adopting the light emitting device illumination system according to the present invention provides an image having high visibility and quality.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An illumination system comprising:
    a light emitting device which emits a light beam having a predetermined wavelength; and
    a reflective holographic optical element which reduces a cross section of the emitted light beam.

2. The illumination system as claimed in claim 1, wherein the light emitting device is one of an LED (light emitting diode), an LD (laser diode), an organic EL (electro luminescent), and an FED (field emission display).

3. The illumination system as claimed in claim 2, further comprising a parallel light beam forming unit which makes the light beam emitted from the light emitting device a parallel light beam.

4. The illumination system as claimed in claim 3, wherein the parallel light beam forming unit is a collimating lens array or a Fresnel lens array.

5. The illumination system as claimed in claim 4, further comprising an optical path changing unit which changes a path of the reduced cross section light beam by selectively transmitting or reflecting the reduced cross section light beam.

6. The illumination system as claimed in claim 5, wherein the light emitting device is formed of an array of light emitters.

7. The illumination system as claimed in claim 5, wherein:
    the illumination system comprises a plurality of the light emitting devices or a plurality of arrays of the light emitting devices, which emit light beams having respective different wavelengths; and
    the plurality of the light emitting devices or the plurality of light emitting device arrays are arranged in a line.

8. The illumination system as claimed in claim 7, wherein:
    the illumination system comprises a plurality of the reflective holographic optical elements and each reflective holographic optical element is arranged to reduce a cross section of a respective one of the emitted light beams; and
    the optical path changing unit comprises a dichroic filter which reflects or transmits the reduced cross section light beams according to the respective wavelength of each reduced cross section light beam.

9. The illumination system as claimed in claim 7, wherein:
    the illumination system comprises a plurality of the reflective holographic optical elements and each reflective holographic optical element is arranged to reduce a cross section of a respective one of the emitted light beams; and
    the optical path changing unit comprises a cholesteric band modulation filter which reflects or transmits the reduced cross section light beams according to a respective polarization direction and the respective wavelength of each reduced cross section light beam.

10. The illumination system as claimed in claim 9, wherein the cholesteric band modulation filter comprises:
    a first mirror surface which reflects a light beam of right circular polarization and transmits a light beam of left circular polarization; and
    a second mirror surface which transmits a light beam of right circular polarization and reflects a light beam of left circular polarization, with respect to a light beam having a predetermined wavelength.

11. The illumination system as claimed in claim 5, wherein:
    the illumination system comprises a plurality of the light emitting devices or a plurality of arrays of the light emitting devices which emit light beams having respective different wavelengths, and '
    the plurality of the light emitting devices or the plurality of light emitting device arrays are arranged separated by a predetermined angle.

12. The illumination system as claimed in claim 11, wherein the optical path changing unit is an X prism or X type dichroic filter.

13. The illumination system as claimed in claim 12, wherein:
    the illumination system comprises a plurality of the reflective holographic optical elements and each reflective holographic optical element is arranged to reduce a cross section of a respective one of the light beams; and
    wherein each light emitting device or light emitting device array and the corresponding reflective holographic optical element are further arranged in a multiple layer structure.

14. The illumination system as claimed in claim 3, further comprising an optical path changing unit which changes a path of the light beam by selectively transmitting or reflecting the reduced cross section light beam.

15. The illumination system as claimed in claim 14, wherein the light emitting device is formed of an array of light emitters.

16. The illumination system as claimed in claim 14, wherein the illumination system comprises a plurality of the light emitting devices or a plurality of arrays of the light emitting devices which emit light beams having respective different wavelengths and the plurality of light emitting devices or the plurality of light emitting device arrays are arranged in a line.

17. The illumination system as claimed in claim 16, wherein: the illumination system comprises a plurality of the reflective holographic optical elements and each reflective holographic optical element is arranged to reduce a cross section of a respective one of the emitted light beams; and
    the optical path changing unit comprises a dichroic filter which reflects or transmits the reduced cross section light beams according to the respective wavelength of each reduced cross section light beam.

18. The illumination system as claimed in claim 16, wherein: the illumination system comprises a plurality of the reflective holographic optical elements and each reflective holographic optical element is arranged to reduce a cross section of a respective one of the light beams; and
    the optical path changing unit comprises a cholesteric band modulation filter which reflects or transmits the reduced cross section light beams according to a respective polarization direction and the wavelength of each reduced cross section light beam.

19. The illumination system as claimed in claim 18, wherein the cholesteric band modulation filter comprises:
   a first mirror surface which reflects a light beam of right circular polarization and transmits a light beam of left circular polarization; and
   a second mirror surface which transmits a light beam of right circular polarization and reflects a light beam of left circular polarization, with respect to a light beam having a predetermined wavelength.

20. The illumination system as claimed in claim 1, further comprising an optical path changing unit which changes a path of the light beam by selectively transmitting or reflecting the reduced cross section light beam.

21. The illumination system as claimed in claim 20, wherein:
   the illumination system comprises a plurality of the light emitting devices or a plurality of arrays of the light emitting devices, which emit light beams having respective different wavelengths, and
   the plurality of the light emitting devices or the plurality of light emitting device arrays are arranged separated by a predetermined angle.

22. The illumination system as claimed in claim 21, wherein the optical path changing unit comprises an X prism or X type dichroic filter.

23. A projector comprising:
   an illumination system comprising:
      a light emitting device which emits a light beam having a predetermined wavelength, and
      a reflective holographic optical element which reduces a cross section of the emitted light beam;
   a display device which forms an image by processing the emitted light beam emitted according to an input image signal; and
   a projection lens unit which magnifies the image formed by the display device and projects the magnified image onto a screen.

24. The projector as claimed in claim 23, wherein the light emitting device is one of an LED (light emitting diode), an LD (laser diode), an organic EL (electro luminescent), and an FED (field emission display).

25. The projector as claimed in claim 24, further comprising a parallel light beam forming unit which makes the emitted light beam a parallel light beam.

26. The projector as claimed in claim 25, wherein the parallel light beam forming unit comprises a collimating lens array or a Fresnel lens array.

27. The projector as claimed in claim 25, wherein the illumination system further comprises:
   a plurality of the light emitting devices or a plurality of arrays of the light emitting devices which emit light beams having respective different wavelengths and which are arranged in a line;
   a plurality of the reflective holographic optical elements where each reflective holographic optical element is arranged to reduce a cross section of a respective one of the emitted light beams; and
   an optical path changing unit which changes a path of the reduced cross section light beams by selectively transmitting or reflecting the reduced cross section light beams and transmits the selectively transmitted or reflected reduced cross section light beams toward the display device.

28. The projector as claimed in claim 27, wherein the optical path changing unit comprises a dichroic filter which reflects or transmits the reduced cross section light beams according to the respective wavelengths of the light beams.

29. The projector as claimed in claim 27, wherein the optical path changing unit comprises a cholesteric band modulation filter which reflects or transmits the reduced cross section light beams according to a respective polarization direction and the respective wavelengths of the light beams.

30. The projector as claimed in claim 25, wherein the illumination system further comprises:
   a plurality of the light emitting devices or a plurality of arrays of the light emitting devices which emit light beams having respective different wavelengths, and which are separated by a predetermined angle;
   a plurality of the reflective holographic optical elements where each reflective holographic optical element is arranged to reduce a cross section of a respective one of the emitted light beams; and
   an optical path changing unit which changes a path of the reduced cross section light beams by selectively transmitting or reflecting the reduced cross section light beams and transmits the selectively transmitted or reflected reduced cross section light beams toward the display device.

31. The projector as claimed in claim 30, wherein the optical path changing unit comprises an X prism or X type dichroic filter.

32. The projector as claimed in claim 24, wherein the illumination system comprises a plurality of the light emitting devices arranged as an array.

33. The projector as claimed in claim 32, wherein the illumination system further comprises an optical path changing unit which changes a path of the reduced cross section light beam by selectively transmitting or reflecting the reduced cross section light beam and transmits the selectively transmitted or reflected reduced cross section light beam from the illumination system.

34. The projector as claimed in claim 33, further comprising a fly eye lens which makes the light beam transmitted from the illumination system a parallel light beam, and
   a relay lens which condenses the parallel light beam toward the display device.

35. The projector as claimed in claim 24, wherein the illumination system further comprises:
   a plurality of the light emitting devices or a plurality of arrays of the light emitting devices which emit light beams having respective different wavelengths arranged in a line;
   a plurality of the reflective holographic optical elements where each reflective holographic optical element is arranged to reduce a cross section of a respective one of the light beams; and
   an optical path changing unit which changes a path of the reduced cross section light beams by selectively transmitting or reflecting the reduced cross section light beams and transmits the selectively transmitted or reflected reduced cross section light beams toward the display device.

36. The projector as claimed in claim 35, wherein:
   the optical path changing unit comprises a dichroic filter which reflects or transmits the reduced cross section light beams according to the respective wavelengths of the light beams.

37. The projector as claimed in claim 35, wherein:
   the optical path changing unit comprises a cholesteric band modulation filter which reflects or transmits the reduced cross section light beams according to a respective polarization direction and the wavelength of each reduced cross section the light beam.

38. The projector as claimed in claim 24, wherein the illumination system further comprises:
   a plurality of the light emitting devices or a plurality of arrays of the light emitting devices which emit light beams having respective different wavelengths and which are separated by a predetermined angle;
   a plurality of the reflective holographic optical elements where each reflective holographic optical element is arranged to reduce a cross section of a respective one of the emitted light beams; and
   an optical path changing unit which changes a path of the reduced cross section light beams by selectively transmitting or reflecting the reduced cross section light beams and transmits the selectively transmitted or reflected reduced cross section light beams toward the display device.

39. The projector as claimed in claim 38, wherein the optical path changing unit comprises an X prism or X type dichroic filter.

40. The projector as claimed in claim 38, wherein:
   the light emitting devices or the light emitting device arrays and the corresponding reflective holographic optical elements are arranged in a multiple layer structure.

41. The projector as claimed in claim 23, wherein the illumination system further comprises an optical path changing unit which changes a path of the reduced cross section light beam by selectively transmitting or reflecting the reduced cross section light beam and transmits the selectively transmitted or reflected reduced cross section light beam from the illumination system.

42. The projector as claimed in claim 41, further comprising:
   a fly eye lens which makes the light beam transmitted from the illumination system a parallel light beam, and
   a relay lens which condenses the parallel light beam passing through the fly eye lens toward the display device.

* * * * *